United States Patent
Brown et al.

(10) Patent No.: US 11,266,950 B2
(45) Date of Patent: Mar. 8, 2022

(54) METHODS AND COMPOSITIONS FOR SCRUBBING CHLORINE-CONTAINING GASES

(71) Applicant: CHEMTREAT, INC., Glen Allen, VA (US)

(72) Inventors: William Brown, Fairhope, AL (US);
Douglas Godwin, Fairhope, AL (US);
Travis Scoper, Saraland, AL (US)

(73) Assignee: CHEMTREAT, INC., Glen Allen, VA (US)

( * ) Notice: Subject to any disclaimer, the term of this patent is extended or adjusted under 35 U.S.C. 154(b) by 0 days.

(21) Appl. No.: 17/252,105

(22) PCT Filed: Jun. 28, 2019

(86) PCT No.: PCT/US2019/039871
§ 371 (c)(1),
(2) Date: Dec. 14, 2020

(87) PCT Pub. No.: WO2020/006439
PCT Pub. Date: Jan. 2, 2020

(65) Prior Publication Data
US 2021/0252455 A1  Aug. 19, 2021

Related U.S. Application Data

(60) Provisional application No. 62/691,264, filed on Jun. 28, 2018.

(51) Int. Cl.
*B01D 53/34* (2006.01)
*B01D 53/68* (2006.01)
*B01D 53/78* (2006.01)

(52) U.S. Cl.
CPC ........... *B01D 53/78* (2013.01); *B01D 53/346* (2013.01); *B01D 53/68* (2013.01); *B01D 2257/2025* (2013.01)

(58) Field of Classification Search
CPC .. B01D 53/68; B01D 53/78; B01D 2251/604; B01D 2251/606; B01D 2257/20;
(Continued)

(56) References Cited

U.S. PATENT DOCUMENTS 3,064,031 A * 11/1962 Zimmerer ............. C07F 9/4006
558/134
3,442,608 A * 5/1969 Addinall ................... C23G 1/36
423/488

(Continued)

FOREIGN PATENT DOCUMENTS

| EP | 0092913 A1 | 11/1983 |
|---|---|---|
| JP | H07-213862 A | 8/1995 |
| WO | 2018/026260 A1 | 2/2018 |

OTHER PUBLICATIONS

Sep. 23, 2019 International Search Report issued in International Patent Application No. PCT/US2019/039871.
(Continued)

*Primary Examiner* — Timothy C Vanoy
(74) *Attorney, Agent, or Firm* — Oliff PLC

(57) ABSTRACT

Methods and compositions are described that remove chlorine from a chlorine-containing gas stream. The method includes adding a carbonate salt and optionally a scale inhibitor to a scrubbing liquid in a wet scrubbing system, and contacting the chlorine-containing gas with the scrubbing liquid. The amount of carbonate salt that is added can vary depending on the pH of the scrubbing liquid.

12 Claims, 2 Drawing Sheets

(58) Field of Classification Search
CPC ....... B01D 2257/2025; B01D 2258/025; B01J 10/00; C23F 11/06; A62D 3/30
See application file for complete search history.

(56) References Cited

U.S. PATENT DOCUMENTS

| | | | | |
|---|---|---|---|---|
| 4,806,259 | A * | 2/1989 | Amjad | B01D 65/02 |
| | | | | 210/699 |
| 5,246,677 | A | 9/1993 | Moser et al. | |
| 5,266,287 | A | 11/1993 | Johnson | |
| 5,863,316 | A * | 1/1999 | Lordo | B01D 53/40 |
| | | | | 95/204 |
| 5,980,850 | A * | 11/1999 | Lebl | C23G 1/36 |
| | | | | 423/394.2 |
| 5,985,223 | A * | 11/1999 | Saxena | B01D 53/1406 |
| | | | | 423/235 |
| 6,365,121 | B1 * | 4/2002 | Wurmbauer | C23G 1/36 |
| | | | | 423/488 |
| 8,734,739 | B2 * | 5/2014 | Horne | C21B 15/00 |
| | | | | 423/138 |

OTHER PUBLICATIONS

Sep. 23, 2019 Written Opinion issued in International Patent Application No. PCT/US2019/039871.

* cited by examiner

METHODS AND COMPOSITIONS FOR SCRUBBING CHLORINE-CONTAINING GASES

BACKGROUND

In wet scrubbing systems, liquid is sprayed or injected into a gas stream so that the liquid removes constituents in the gas stream by chemical reaction, adsorption, or absorption. Scrubbing system can be used to remove particulates, environmental pollutants, and other unwanted materials from gas streams.

Chlorine is a byproduct in many chemical reactions. Chlorine is toxic and manufacturers are required by laws and regulations to limit or eliminate chlorine emissions.

In wet scrubber systems, aqueous sodium hydroxide is used to increase the pH of the scrubbing liquid and to drive chlorine into solution. The sodium hydroxide also reacts with chlorine in gas streams to produce sodium hypochlorite and salt according to the following reaction:

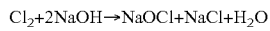

$Cl_2 + 2NaOH \rightarrow NaOCl + NaCl + H_2O$

SUMMARY

It has been discovered that conventional chemistries used in chlorine scrubber systems accelerate the degradation of equipment vessels and piping, particularly those that come into contact with high temperature solutions (e.g., 80-110° C.) that include one or more of hypochlorite, "wet" chlorine, and hydrochloric acid. For example, these solutions are sprayed in wet scrubbing systems onto brick/mortar walls which degrades the mortar and in turn can cause the bricks to shift and break rubber lining on the equipment, thereby exposing and corroding a carbon steel casing of the equipment. The high temperature solutions can also can degrade fiber reinforced plastics that are sometimes used in the basin, spray piping, and spray headers of wet scrubbing systems. It is believed that the current practice of feeding sodium hydroxide to maintain a high pH in the scrubber water contributes to the problem.

In accordance with one aspect of this invention, it has been discovered that the degradation of the equipment and conduits can be mitigated by modifying the chemistry used in the scrubbing operation.

In one aspect, this disclosure provides a method for removing chlorine from a chlorine-containing gas stream by adding a carbonate salt and a scale inhibitor to a scrubbing liquid in a wet scrubbing system, and contacting the chlorine-containing gas stream with the scrubbing liquid. The carbonate salt and scale inhibitor can be added to the scrubbing liquid in a weight ratio that is in the range of from 300:1 to 10:1.

In another aspect, this disclosure provides a method for removing chlorine from a chlorine-containing gas stream using a wet scrubbing system with a scrubbing liquid, in which the method includes measuring a pH of the scrubbing liquid, contacting the chlorine-containing gas stream with the scrubbing liquid, and controlling the pH of the scrubbing liquid by adding a carbonate salt to the scrubbing liquid. The amount of the carbonate salt that is added can be based on the measured pH of the scrubbing liquid.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1:
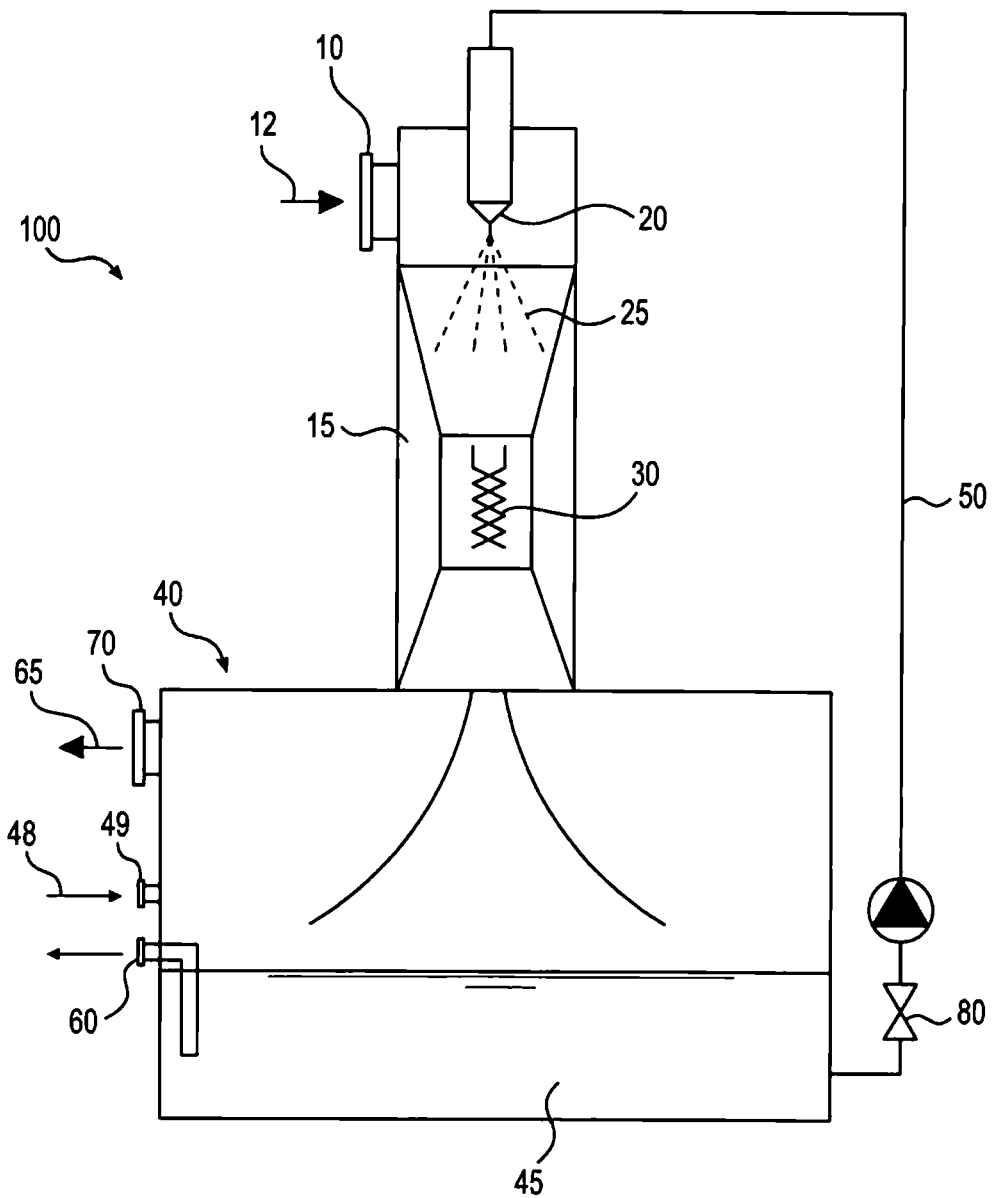
FIG. 1 is a schematic diagram of a venturi scrubber used to remove chlorine from a gas stream.

The scrubbing system and methods described herein can be used to effectively remove or reduce chlorine from any chlorine-containing gas stream while preventing deterioration of equipment and conduits in the system. The scrubbing systems can be wet scrubbing systems that are used in industrial processes that generate chlorine containing gas. As one example, in steel mills, steel is pickled with HCl, which requires the acid to be regenerated in a spray roasting process that produces a waste gas stream containing chlorine gas and hydrochloric acid. The chlorine needs to be removed before the gas is vented to the environment.

In embodiments of the scrubbing system according to the present invention, the scrubbing liquid that strips the chlorine from the gas can include a treatment composition comprising carbonate salt. The carbonate salt can include, for example, potassium carbonate, sodium carbonate, and combinations thereof. Potassium salt is preferred since sodium carbonate is more difficult to get into solution. Potassium salt is particularly preferred in wet scrubbing systems that are used to scrub gases in a spray roasting process since the sodium ion may interfere with the absorber in such a process.

The treatment composition can further include a scale inhibitor, which inhibits deposition in scale-forming waters of the scrubbing system. The scale inhibitor can be an organophosphonate such as 2 phosphono-1,2,4,-butane tricarboxylic acid (PBTC).

The carbonate salt and the scale inhibitor can be added to the scrubbing liquid in a weight ratio that is in the range of from 300:1 to 10:1, from 200:1 to 30:1, from 150:1 to 50:1, or from 100:1 to 25:1, for example. The carbonate salt can be added to the scrubbing liquid in amounts of, for example, 1 kg/hr to 25 kg/hr, 2 kg/hr to 15 kg/hr, or 5 kg/hr or 10 kg/hr depending on operating conditions. The scale inhibitor can be added to the scrubbing liquid in amounts of, for example, 15 g/hr to 500 g/hr, from 50 g/hr to 300 g/hr, or from 100 g/hr to 250 g/hr, depending on operating conditions. The specific amount that is needed will depend on a variety of factors that are unique to each process such as the number of spray booms, burner temperatures, dust scrubber packing age, water scrubbing packing age, waste acid profile, roaster oxide screw degradation or unavailability, etc.

The treatment composition can be added to the scrubbing liquid of the scrubbing system as an aqueous treatment composition that can include, for example, from 0.1 to 5 wt. % or 0.5 to 2 wt. % scale inhibitor, and from 25 to 99 wt. %, 40 to 99 wt. %, 60 to 90 wt. % of carbonate salt, or from 40 to 50 wt. % of carbonate salt. About 20-250 gallons of such a treatment composition could typically be added to the scrubbing liquid each day, depending on operating conditions.

The use of carbonate salt provides for an increase in pH of the scrubbing liquid, which facilities driving the chlorine gas into solution and also provides buffering capacity by increasing the carbonate alkalinity. This can provide for more consistent pH control in the scrubber, which means fewer sodium hydroxide totes and less operator burden to maintain the pH within limits. The scale inhibitor allows the treatment composition to achieve the goal of maintaining a high pH and removing chlorine while preventing the spray equipment from malfunctioning due to scaling caused by the carbonate salt or its reaction products with chlorine. Likewise, the scale inhibitor allows the pH to be increased higher than would otherwise be possible, which further facilitates driving chlorine into solution to effect its removal. The treatment composition also reduces the blowdown required for the sump liquid since higher concentrations of the carbonate salt and/or its reaction products can be recirculated without significant scaling.

The carbonate salt/scale inhibitor composition can be used in the scrubbing liquid alone or in addition to sodium hydroxide. When used in combination with the carbonate salt/scale inhibitor, the sodium hydroxide can be used at a greatly reduced rate, which can lower the overall cost of treatment. Reducing the amount of sodium hydroxide also reduces the sodium hypochlorite that is in the scrubbing liquid, which is believed to be one cause of the deterioration of the fiber reinforced plastics (e.g., fiber reinforced epoxies, vinyl esters, etc.) that are used in the scrubbing equipment. In this regard, the reaction products of carbonate salt are chlorite and/or chlorate salts (e.g., potassium chlorite and/or potassium chlorate), which are less corrosive than sodium hypochlorite. If sodium hydroxide is used to increase pH, it can be present in amounts of less than half of the carbonate salt by weight, less than a quarter of the carbonate salt by weight, less than one tenth of the carbonate salt by weight, or less than one fiftieth of the carbonate salt by weight.

The treatment can also include a scavenger compound that mitigates atmospheric discharge of chlorine gas in one or two ways: (1) will remove chlorine gas when sprayed into the gas path, and/or (2) it will scavenge sodium hypochlorite in the circulating water. Suitable compounds can include sodium thiosulfate and sodium bisulfite. Sufficient amounts of these compounds can be added so that preferably the concentration of sodium hypochlorite in the circulating water is kept to below 1,000 ppm, and preferably below 500 ppm or below 100 ppm.

The methods and compositions described herein can employ various wet scrubbing equipment, including a venturi scrubber, for example. FIG. 1 is a schematic diagram of a venturi scrubber system 100. The venturi scrubber system 100 includes venturi scrubber 15 having a gas inlet 10 that introduces the gas 12 which contains chlorine. In some embodiments, the gas 12 also includes HCl. Nozzle 20 sprays the aqueous scrubbing liquid 25 so that the liquid contacts the chlorine-containing gas. The scrubbing liquid that contacts the chlorine-containing gas includes primarily water (e.g., more than 75 wt. % or more than 90 wt. %), the treatment composition (carbonate salt/scale inhibitor), and optionally sodium hydroxide and sodium thiosulfate. Packing material 30 increases the contact area between the gas and the liquid. Basin 40 receives the liquid containing the chlorine gas and/or reaction products which collect as sump 45. Makeup liquid 48, which is preferably water (e.g., at least 99% water) can be added as needed through inlet 49. Recycle loop 50 pumps the sump liquid 45 to nozzle 20. Valve 80 can control the flow of sump liquid 45 to the nozzle. The sump liquid 45 can be removed through outlet 60, e.g., as blowdown. The scrubbed gas 65 exits through gas outlet 70.

The addition of the carbonate salt, scale inhibitor, sodium hydroxide, and/or scavenger compound to the process water can be monitored and controlled.

Since maintaining an elevated pH (e.g., in the range of 7.5-11.5, 8.0-9.5, or 8.4-8.8) facilitates driving the chlorine gas into solution to be removed from the gas path by the scrubbing system, the injection rate of carbonate salt and optionally sodium hydroxide can be controlled by an online pH instrument whereby pH is measured and the amounts of these components added to the process water are controlled based on the measured pH, e.g., by using an automatic controller that includes a processor that calculates the desired addition amount of the treatment composition based on measured pH. The controller can include a PID loop, for example. In one embodiment, the pH is controlled to be within the range of 8.5-8.7 S. U. Increasing the pH control range closer to 12 S. U. could increase the removal of chlorine, but may contribute to nozzle and packing fouling in the scrubbing equipment. Thus, the amount of the carbonate salt and optionally caustic that is added to the scrubbing liquid is variable depending on the operating conditions of the wet scrubber system, but should be sufficient to elevate the pH of the scrubbing system to the desired operating level.

The injection rate of scavenger compound can be controlled using an oxidation reduction potential (ORP) instrument, with a control range of 0-300 mV as a target.

The addition of the treatment compositions and/or scavenger compound to the scrubbing liquid can be controlled by pumps and valves that receive signals from a controller (e.g., CPU or other processor) that determine the desired amounts of components to add to the sump liquid. The controller may also control the valves and pumps in the system to control the quantity of sump liquid that is sprayed into the wet scrubber system, or to control the amount and/or composition of makeup water, or to control the amount of blowdown. The blowdown rate can be controlled to maintain absorber efficiency and prevent gas path carryover issues.

The temperature of the scrubbing liquid in the sump can be in the range of from 60-150° C., from 80-110° C., and from 90-100° C.

The treatment compositions and methods described herein can prevent or slow down the degradation of equipment vessels and piping used in the scrubbing system as compared to conventional techniques that employ primarily sodium hydroxide to raise the pH of the scrubbing liquid. The equipment vessels or piping in the scrubber can be made of—or include components that are made of made of—plastic, fiber reinforced plastic, or rubber. Examples of materials used in the equipment vessels or piping can include epoxy resins such as aromatic amine cured epoxy resins and epoxy vinyl ester resins.

In embodiments, the treatment compositions and methods of treatment of the invention can also reduce the environmental impact of chlorine-producing operations by mitigating the discharge of chlorine gas to the atmosphere and also by making the operations more efficient.

Example Field Trial

A field trial was conducted on a venturi scrubber installed on an acid recovery roaster in a steel mill. The scrubber includes fiber reinforced plastic (FRP) piping, which are susceptible to degradation in the presence of sodium hypochlorite, "wet" chlorine gas, and hydrochloric acid solutions when operated at high temperatures. The scrubber equipment and piping had experienced degradation problems due to the practice of feeding only sodium hydroxide to the scrubbing liquid.

In this experiment, a treatment composition was added to the scrubbing liquid as needed based on a measured pH to maintain the scrubber solution pH within a defined operating range. The experimental treatment composition is an aqueous solution including potassium carbonate (about 40-60 wt.

%) and PBTC (about 0.5 to 5 wt. %). A sodium thiosulfate solution (about 30-50 wt. %) is separately added.

PH OL is a pH measurement form online measurement instrumentation. The remaining measurements were taken with a calibrated portable instrument using a grab sample point taken at the dust scrubber recirculation pump discharge. In Table 1 below, PH OL is the measured pH from the online instrumentation, PH SU is the pH measured on the grab sample, COND is conductivity in milliSiemens/cm, and ORP is oxidation-reduction potential in millivolts.

TABLE 1

| DATE | TIME | TEMP (C) | PH OL | PH, SU | COND, (mS) | ORP (mV) | NOTES |
|---|---|---|---|---|---|---|---|
| 3-Jul | 8:30 | 88 | 8.60 | 6.60 | 64.71 | 370 | 25% NaOH solution added |
| 3-Jul | 11:00 | 100 | 9.40 | 9.10 | 79.70 | 720 | 25% NaOH solution added |
| 3-Jul | 19:00 | 88 | 9.10 | 8.49 | 58.10 | 745 | 25% NaOH solution added |
| 4-Jul | 7:00 | 87 | 9.10 | 8.86 | 68.01 | 759 | 25% NaOH solution added |
| 5-Jul | 8:45 | 85 | 9 | 8.64 | 110 | 806 | 25% NaOH solution added |
| 5-Jul | 12:30 | 85 | 9.10 | 8.82 | 120.2 | 801 | 25% NaOH solution added |
| 5-Jul | 15:20 | 104 | 9.00 | 8.74 | 133 | 98 | 45 gal Sodium thiosulfate solution added. 25% NaOH solution added |
| 5-Jul | 16:30 | 104 | 9.00 | 8.59 | 142 | 94 | 25% NaOH solution added |
| 5-Jul | 18:15 | 104 | 8.9 | 8.52 | 124 | 96 | 25% NaOH solution added |
| 6-Jul | 7:00 | 98 | 9.1 | 8.79 | 134 | 138 | 25% NaOH solution added |
| 6-Jul | 12:20 | 85 | 9.2 | 8.88 | 125 | 780 | 25% NaOH solution added |
| 10-Jul | 6:30 | 83 | 9.3 | 8.98 | 110 | 783 | Treatment composition blended into stream; caustic addition reduced to 10% (by vol.) of total treatment added. |
| 10-Jul | 9:10 | 85 | 9.2 | 8.67 | | 795 | Treatment composition blended into stream; caustic addition reduced to 10% (by vol.) of total treatment added. |
| 10-Jul | 11:50 | 84 | 8.6 | 8.78 | 83 | 822 | Treatment composition blended into stream; caustic addition reduced to 10% (by vol.) of total treatment added. |
| 10-Jul | 14:25 | 83 | 8.6 | 8.89 | 83 | 812 | Treatment composition blended into stream; caustic addition reduced to 10% (by vol.) of total treatment added. |
| 11-Jul | 7:00 | | | 7.72 | 71 | 893 | Treatment composition blended into stream; caustic addition reduced to 10% (by vol.) of total treatment added. |
| 11-Jul | 10:30 | 96 | 8.3 | 7.64 | 70 | 685 | Treatment composition blended into stream; caustic addition reduced to 10% (by vol.) of total treatment added. |
| 12-Jul | 8:00 | 82 | 7.7 | 7.02 | 48.08 | 885 | Only treatment composition added |
| 12-Jul | 8:45 | 82 | 6.9 | 6 | 44.6 | 1000 | Only treatment composition added |
| 12-Jul | 9:00 | 82 | 7.5 | 7.39 | 43.85 | 857 | Only treatment composition added |
| 12-Jul | 9:15 | 83 | 7.4 | 6.81 | 43.55 | 914 | Only treatment composition added |
| 12-Jul | 9:30 | 83 | 7.4 | 6.88 | 42.46 | 908 | Only treatment composition added |
| 12-Jul | 9:35 | 83 | 7.5 | 7.33 | 42.2 | 877 | Only treatment composition added |
| 12-Jul | 9:50 | 83 | 7.6 | 7.68 | 42.63 | 856 | Only treatment composition added |
| 12-Jul | 11:15 | 82 | 7.6 | 7.55 | 39.99 | 864 | Only treatment composition added |
| 12-Jul | 11:55 | 82 | 7.7 | 7.61 | 39.19 | 865 | Only treatment composition added |
| 12-Jul | 12:30 | 82 | 7.7 | 7.36 | 39.85 | 880 | Only treatment composition added |
| 12-Jul | 13:00 | | | 8.47 | 43.64 | 280 | Only treatment composition added |
| 12-Jul | 13:15 | 83 | 7.8 | 7.66 | 43.64 | 390 | Only treatment composition added |
| 12-Jul | 13:30 | 81 | 7.8 | | | 890 | Only treatment composition added |
| 12-Jul | 13:45 | 82 | 7.9 | 7.95 | 44.13 | 163 | Treatment composition and sodium thiosulfate added. |
| 12-Jul | 14:00 | | | 6.43 | 44.73 | 278 | Only treatment composition added |
| 12-Jul | 15:10 | | | 7.85 | 48.4 | 843 | Only treatment composition added |
| 12-Jul | 15:35 | 81 | 7.6 | 7.59 | 46.65 | 878 | Only treatment composition added |
| 12-Jul | 16:55 | 81 | 7.7 | 7.88 | 46.1 | 859 | Only treatment composition added |
| 12-Jul | 17:25 | 81 | 7.6 | 7.6 | 44.36 | 887 | Only treatment composition added |
| 12-Jul | 18:00 | 81 | 7.8 | 9.8 | 44.46 | 715 | Only treatment composition added |

Figure 2:
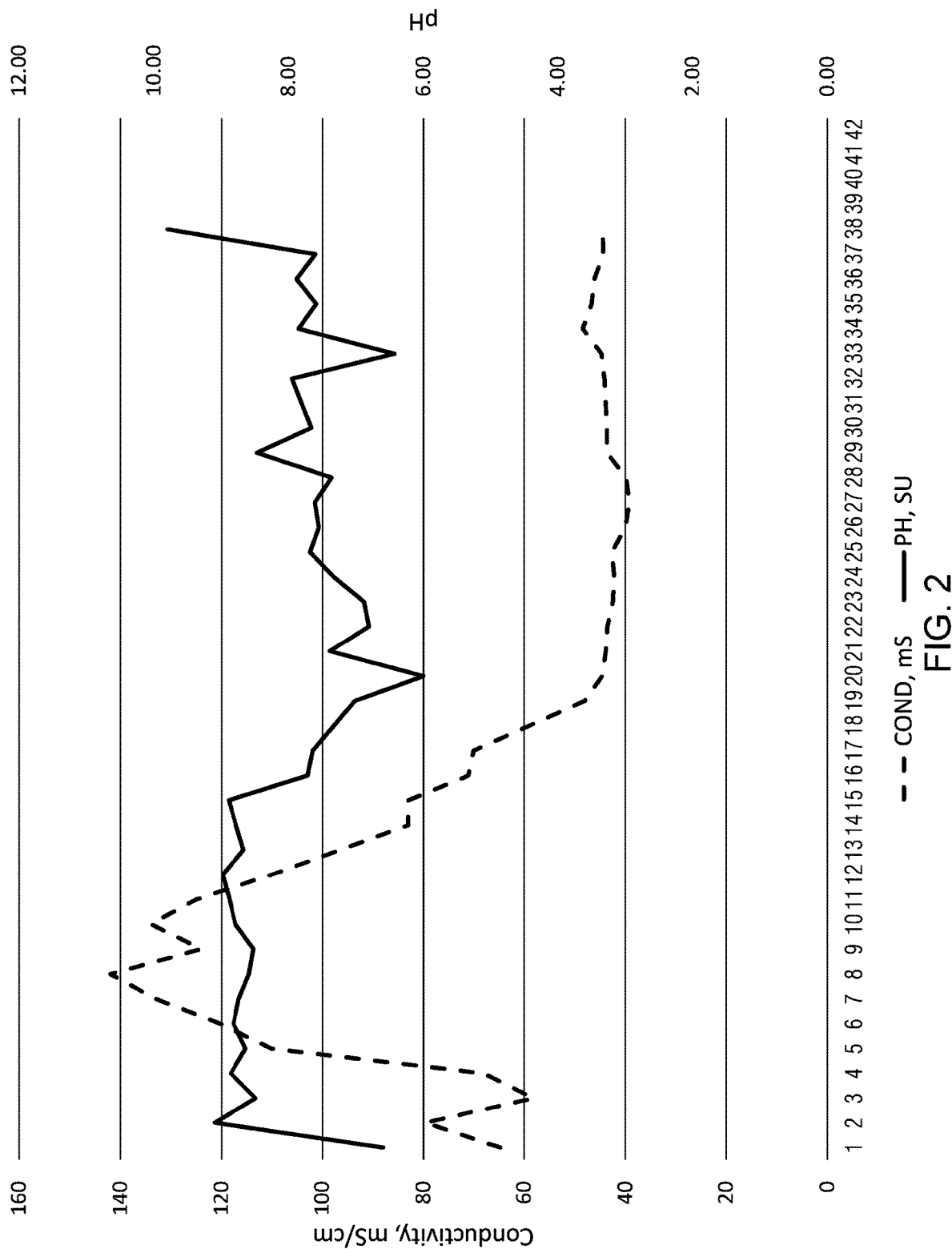
FIG. 2 is a graph illustrating the conductivity and pH of scrubbing liquid in a venturi scrubber during an experimental field trial.

FIG. 2 is a graph showing the conductance of the scrubbing water in this experiment at each measurement point together with the pH. FIG. 2 shows that the conductance of the scrubbing water is significantly reduced by the replacement of caustic with the treatment composition. This is directly correlated to the reduction of corrosive ions in the scrubbing water, such as hydroxide. The experiment thus demonstrates that the treatment composition can be added to maintain the operating pH of the scrubbing water while significantly reducing the capacity of the scrubbing water to support reactions that break down the scrubber system equipment.

The treatment composition was also observed to maintain the same pressure differential as a caustic treatment across the packing section of the absorber, which indicates that the packing was not fouled by the carbonate treatment composition.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method for removing chlorine from a chlorine-containing gas stream, the method comprising:

adding a carbonate salt and a scale inhibitor to a scrubbing liquid in a wet scrubbing system, the carbonate salt and scale inhibitor being added to the scrubbing liquid in a weight ratio that is in the range of from 300:1 to 10:1; and contacting the chlorine-containing gas stream with the scrubbing liquid.

2. The method of claim 1, wherein the carbonate salt, and optionally sodium hydroxide, is added in amounts that are sufficient so that the scrubbing liquid has an alkaline pH.

3. The method of claim 1, wherein the carbonate salt, and optionally sodium hydroxide, is added in amounts that are sufficient so that the scrubbing liquid has a pH in the range of from 7.5 to 9.5.

4. The method of claim 1, wherein the scale inhibitor is an organophosphonate compound.

5. The method of claim 4, wherein the scale inhibitor is 2-phosphono-1,2,4,-butane tricarboxylic acid.

6. The method of claim 1, further comprising adding a scavenger compound to the scrubbing liquid.

7. The method of claim 1, wherein the carbonate salt is potassium carbonate.

8. The method of claim 1, wherein the chlorine-containing gas stream is contacted with the scrubbing liquid in a venturi scrubber.

9. The method of claim 1, wherein the wet scrubbing system includes a vessel or piping that is made of a resin composition.

10. The method of claim 9, wherein the resin composition is an epoxy resin.

11. The method of claim 9, wherein the vessel or piping is made of a fiber reinforced plastic.

12. The method of claim 1, wherein the carbonate salt and scale inhibitor are added to the scrubbing liquid in a weight ratio in the range of from 100:1 to 25:1.

* * * * *